3,336,253
METHOD OF SOLUBILIZING RESINOUS MATERIALS
Robert Wong and Philip W. Sullivan, Newark, Ohio, assignors to Owens-Corning Fiberglas Corporation, a corporation of Delaware
No Drawing. Filed Apr. 6, 1966, Ser. No. 540,532
13 Claims. (Cl. 260—29.2)

The present invention relates to water soluble resins having a solubilizing group such as is obtained by the acid salt of the reaction product of an epoxide and a primary or a secondary monoamine containing at least one hydroxy substituant. The water soluble resins are particularly helpful as coatings for glass, metals and other materials; and are particularly useful as forming size compositions for glass fibers.

This application is a continuation in part application of our copending application Serial No. 213,133, filed July 30, 1962, now abandoned.

It is a general rule that polymeric materials, both natural and synthetic, decrease in solubility, in both water and organic solvents, as the molecular weight of the polymers increases. The solubility of organic polymers is much less in water than in organic solvents, and while it has been possible heretofore to provide some solubility of low molecular weight materials in water, the only coating systems which utilize water as a carrier and which have met with any commercial success, have been those in which the polymers have been in an emulsified form. From the results which have been obtained by the present invention, it is apparent that the properties of a polymer as a coating will not only vary with the particular molecular construction of the polymer, but will vary with the particular physical arrangement of the polymer, and with the nature of the applying vehicle. The properties of the coating are radically different when laid down from a solution than when laid down from an emulsion, and may further be modified by the degree of polarity of the vehicle. It has been found that if long chain polymers are provided with a terminal solubilizing group adjacent only one of its ends, and the material is applied to a surface from a water solution, the polymer will orient itself on the surface in a very desirable manner. After drying the coating is generally impervious to water. Highly significant improvements in coating materials can be obtained by solubilizing polymeric materials in the manner above referred to, since a particularly desirable orientation of the molecules is achieved in the finished coating. The technique can be used with all types of polymers and each coating will have unique properties depending upon its molecular arrangement. Epoxy materials make a particularly desirable type of coating, and the invention will be described with particular reference to this type of material.

It is an object of the present invention to provide novel, water soluble, resinous coating materials, especially water soluble epoxides.

A further object is the provision of forming size compositions for glass fibers which contain a water soluble resinous material as a principal ingredient.

Another object is the provision of glass fibers coated with a composition which supplies abrasion resistance and serves to preserve the high strengths of the fibers during processing.

Another object is the provision of new and improved water soluble resins for coating and protecting metals including ferrous metals against corrosion.

Still another object is the provision of a method for solubilizing resinous materials generally including epoxides.

The foregoing objects are achieved by attaching a single solubilizing group type later to be described to the end of a polymer molecule. The solubilizing group can be formed by reacting an oxirane ring, with a primary or secondary monoamine bearing at least one hydroxy substituent, and the subsequent solubilization of the ensuing reaction product by means of the formation of an acid salt.

Due to their excellent abrasion resistance, epoxy resins are highly desirable candidates for the function of the film-forming ingredient in forming size compositions for glass fibers. This desirability is further enhanced by the unusual degree of adhesion to glass which is provided by epoxy resins.

Coatings for glass fibers must have special properties, and to fully appreciate the suitability of epoxy resins in such functions, one must first appraise the demands which are placed upon the film-forming constituent of a forming size composition. Due to the qualities of mutual abrasion and susceptibility to moisture attack which are inherent in glass fibers, the film-former must first serve to protect, shield or cushion the fibers from abrasive contact with other fibers, and must also provide a film or sheath which prevents the intrusion of moisture. In addition, since the sized fibers are conventionally employed in the reinforcing of resinous media, the film-forming ingredient must possess a pronounced degree of compatibility or reactivity with the resins which are reinforced, i.e., the resinous matrix or impregnant.

While the excellent abrasion resistance of epoxy resins and their superior adhesion to glass surface would appear to make them ideal materials for forming size compositions, such has not been the case. The principal factor operating against their suitability has stemmed from the processing conditions experienced in the forming of glass fibers. In the first instance, the glass filaments are normally attenuated at rates of between 10,000 to 15,000 feet per minute. It is immediately apparent that such speeds preclude resort to a thorough curing or drying treatment of the size composition applied to the fibers, and necessitates the utilization of a size composition despite the rapid rate of travel of the fibers. In this regard, forming size compositions which are applied to fibrous glass products at a phase subsequent to fiber-forming. In the case of finishing compositions, the demands placed upon the composition are much less rigorous in that finishing may be conducted at much less rapid rates, with the result that different viscosities and prolonged curing or drying treatments are feasible. Normally, such finishing compositions are applied to glass fibers from which the forming size composition has been removed, and they are usually limited to the treatment of glass fibers which have been woven into a fabric.

In addition to the prohibitive speeds at which glass fibers are formed, the high temperatures which exist at the forming site or position raise additional problems. For example, the fiber-forming bushing is maintained at temperatures in excess of 2000° F. and the utilization of flammable solvent systems of the size compositions creates extreme hazards unless complex and expensive venting systems are employed to remove dangerous fumes and vapors from the forming area.

Still further, since the coated glass fibers are immediately wound into a package form in which adjacent strand loops or segments are in intimate engagement, the coating must be transformed to a nontacky, dry or cured condition a mere fraction of a second after its application in order to prevent the blocking or adhesion of engaging portions of the strand. Only when this is achieved may the strand be unwound from the package with satisfactory ease.

Still another consideration is the strength of the fibers which is actually a measure of the protective function of the size composition since the strength of the composition per se is considerably less than that of the fibers.

In essence, the fibers strengths are preserved or maintained rather than increased, if the size composition provides adequate protection against abrasion and moisture attack.

Consequently, it is apparent that the demands placed upon the film-forming ingredient of a forming size composition, and the properties which it must provide in order to meet such demands, are extensive, but essential to the attainment of glass fibers possessing adequate strengths and processing characteristics.

In the preparation of the epoxy-amine reaction product, the reaction is calculated to yield a reaction product, in which an amine has reacted with a single terminal oxirane group on the polymer molecule, rather than a composition in which a plurality of oxirane or epoxy groups on the molecule are expended in reacting with the amine. The reaction referred to is that in which a hydrogen atom attached to the amine nitrogen atom, opens the oxirane ring of the epoxide reactant to link the amine to one of the two carbon atoms which comprise the oxirane ring and to form a hydroxy group upon the other carbon atom of the oxirane ring. Such a reaction may be generally depicted as follows:

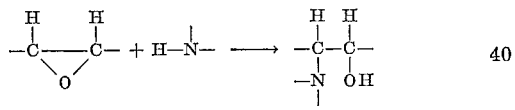

Where the polymer molecule contains more than one terminal oxirane rings, the amine and epoxide reactants are reacted in less than stoichiometric ratios, i.e. less than one mol of active amine hydrogen for each mol of oxirane oxygen. In the conduct of the reaction, a quantity of the amine reactant adequate to render the final reaction product water soluble, but inadequate to react with every oxirane, ring is employed. In reactions involving epoxides possessing between 2 to 5 oxirane groups, the reaction of only one of the oxirane groups with one mol of active amine hydrogen has proved adequate to yield the desired solubility.

Where the solubilized molecule is to be epoxide any compound having at least two oxirane rings can be used. Suitable compounds include both aromatic and non-aromatic epoxides, as well as monomeric and higher compounds. The variety of compounds which have proved susceptible to the amination and solubilization techniques of the present invention span a broad spectrum of compositions which include, but which are not limited to, such epoxides as the glycidyl ethers of phenols, e.g. bis phenol A epoxides, glycidyl ethers of novolac resins, tetra kis epoxides, and the like.

Structural formulae of various types of epoxides which have been satisfactorily aminated and solubilized, and which illustrate the broad range of suitable compounds, are shown as follows:

(I) Glycidyl ethers of phenols (e.g. bis phenol A-epichlorohydrin reaction products):

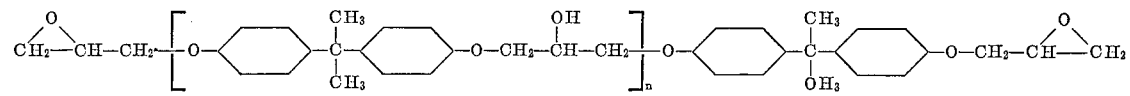

(II) Glycidyl ethers of condensation products of polyhydric phenols and aldehydes (novolac epoxides):

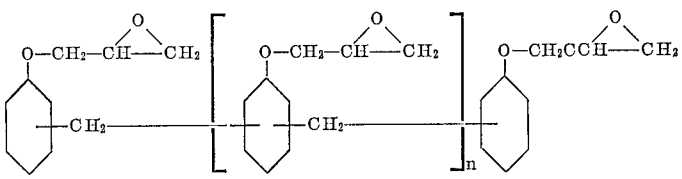

Specific compositions of the above general types which have been satisfactorily utilized, include the following:

(A)

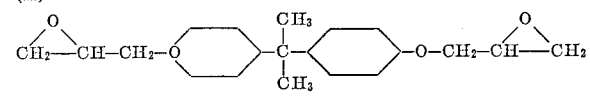

(B)

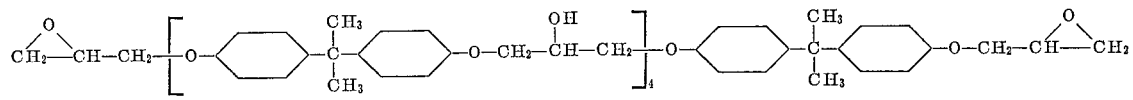

(C)

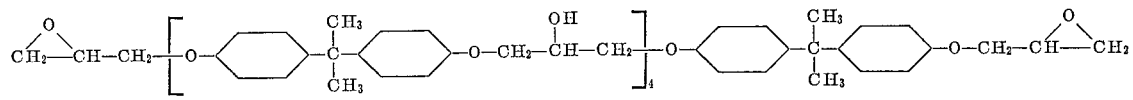

(D)

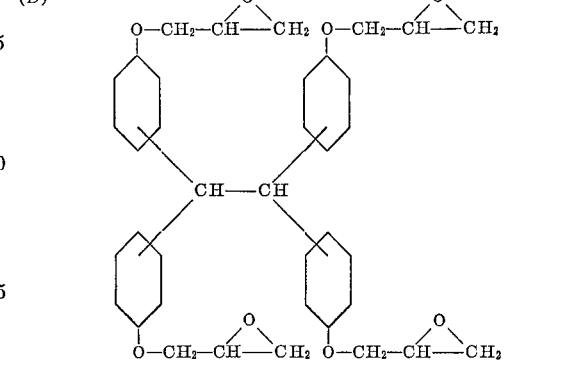

It should be noted that while the above epoxides contain 2 (A and B), 3 (C) or 4 (D) oxirane groups, one mol of the amine reactant was adequate in each instance, to yield water soluble products having the desired qualities of abrasion resistance, lubricity, durability, clarity, storage life, etc.

While the glycidyl ethers of phenols, such as the condensation product of bisphenol A and epichlorohydrin, are preferred epoxide reactants, numerous other compositions and types of compositions are suitable, and such suitability is demonstrated by the above novolac and tetra kis epoxides. In essence, the breadth of suitability of the epoxide reactants, is dictated by the necessity for at least 2 oxirane groups which permits reaction with a quantity of amine inadequate to satisfy all of the oxirane groups, and the consequent attainment of a product which is both solubilized and possessed of the highly desirable properties of epoxy resins in laminating, coating and adhesive utilizations. While an apparent and very extensive improvement is realized in the case of the vast majority of epoxides which are not water soluble, even epoxides which may possess some degree of water solubility may be enhanced in respect to such solubility, by means of the present invention.

The actual reaction of the epoxide and amine may be conducted at moderate temperatures and for relatively short periods of time. For example the reaction of epoxides A and B above, with diethanolamine (1-1 mol ratio) may be successfully achieved at a temperature of 100° C. over a period of one hour. The reaction is preferably conducted in a reaction medium such as diacetone alcohol. Other suitable reaction media include isopropanol, acetone, toluene, chlorinated hydrocarbons, and the like. In this regard, the solubility characteristics of the reaction products in the reaction media may be pertinent. For example, if the removal of the reaction product from the reaction medium is desired, it may be preferable to utilize a reaction medium such as toluene, from which the reaction product may be extracted. In such case, acidified water may be added to dissolve the reaction product which may then be removed upon phase separation. In addition to extraction, distillation may be employed to separate reaction product and reaction medium. However in many instances separation is unnecessary. For example, the reaction product may be prepared in diacetone alcohol, in which it is normally soluble, and an aqueous solution may be prepared from this system. In respect to the previously discussed separation techniques, it should be noted that the reaction system is preferably acidified prior to such separation. For example, in the case of a reaction medium in which the reaction product is insoluble, the system may be acidified and the reaction product may then be extracted with water.

While the foregoing section has referred to the nitrogenous reactant merely as an amine, a specific type of amine is required in order to yield satisfactory qualities of solubility, abrasion resistance, pot life, etc. This composition may be described as a primary or secondary monoamine having at least one valence of the nitrogen atom satisfied by a hydrogen atom, and at least one valence of nitrogen satisfied by an aliphatic radical containing at least one hydroxy group. Such compounds may be generally depicted by the following formula:

wherein R is hydrogen, $R^1$ is an aliphatic hydrocarbon radical containing at least one hydroxy group, and $R^2$ is hydrogen, an aliphatic hydrocarbon radical containing at least one hydroxy group, or an alkyl group having no more than 6 carbon atoms.

More specifically, the aliphatic hydrocarbon radical, or radicals, having at least one hydroxy group, may be illustrated by the formula: $-R^3-(Z)_n-OH$ wherein $R^3$ is an aliphatic hydrocarbon radical having no more than 6 carbon atoms, and including:

(1) the alkanol and dialkanol amines, and their isomers, when $n$ is 0, e.g. ethanolamine, n-propanolamine, butanolamine, diethanolamine, methyl amino ethanol, ethyl amino ethanol, isopropanolamine, di(iso)propanolamine, 2-amino-1-butanol, and the like, (2) amino ethers and alkylene oxide condensates when Z is an ether group, e.g. $-O-R-$ group with R being a divalent hydrocarbon radical having less than 6 carbon atoms, and $n$ having a value of less than 25, e.g. 2-amino ethyl, 2-hydroxy ethyl ether, polyoxyethylene amines, polyoxypropylene amines, and the like, (3) polyhydric alcohol condensates, hydroxy alkyl amines and amino alkanediols, when Z is an R—OH or $R(OH)_2$ group, e.g. 1,2,3,4,5,6-hexahydroxy amine, tris(hydroxymethyl) aminomethane, 2-amino-2-methyl 1,3-propanediol, and the like.

TABLE I

| H\N/Y | —R— | —(Z)— | n | OH | Representative Types of Compounds |
|---|---|---|---|---|---|
| Hydrogen, alkyl or one of the Z radicals | An aliphatic hydrocarbon radical having no more than 6 carbon atoms | | 0 | | (a) Alkanolamines: Ethanolamine, n-propanolamine, butanolamine. (b) Alkyl alkanolamines: Methyl amino ethanol, ethyl amino ethanol. (c) Dialkanolamines: Diethanolamine, di(iso)propanolamine. (d) Isomers: Isopropanolamine, 2-amino-1-butanol. |
| | | —O—R— | 1-25 | | (a) Amino ethers: 2-amino ethyl, 2-hydroxyethyl ether. (b) Alkylene oxide condensates: Polyoxyethylene amine, polyoxypropylene amine. |
| | | OH<br>—R—<br>H<br>or<br>OH<br>—R—<br>OH | 1 | | (a) Polyhydric alcohol condensates: 1,2,3,4,5,6-hexahydroxy amine. (b) Hydroxy amines: Tris(hydroxymethyl)aminomethane, 2-amino-2-methyl, 1,3-propanediol. |

The types of compositions and specific compositions set forth in the above table are merely representative of the types of amine reactants which are suitable for the conduct of the present invention. Essentially, the compound need only be a primary or secondary monoamine having at least one hydrogen atom and at least one aliphatic hydroxy group. The amine group in the final reaction product may be termed a solubilizing group while the active hydrogen atom of the amine reactant is the means of achieving reaction with the epoxide reactant. The aliphatic hydroxy substituent of the amine reactant contributes to the solubilizing effect. In the latter regard, when the aliphatic substituent possesses only one terminal hydroxy group, it is preferable that the overall chain length of this substituent be restricted to no more than 6 carbon atoms. However, when the aliphatic chain is interspersed with oxygen atoms, e.g. ethers (—R—O—R—O—R—) as many as 25 divalent hydrocarbon radicals, each containing no more than 6 carbon atoms, are suitable.

*Solubilization of the epoxide-amine reaction product*

The epoxide-amine reaction product is solubilized by forming its salt with an acid. Either organic or inorganic acids are suitable as demonstrated by the fact that satisfactory, water soluble products have been prepared by forming salts with acetic, lactic, phosphoric, hydrochloric and sulfuric acids.

In preparing the salt, the acid may be added to the admixture of reaction product and reaction medium until a pH slightly on the acid side is reached. The salt may then be separated from the reaction, e.g. by the previously discussed extraction or distillation methods, or may be maintained in admixture during the storage phase, or even until final use if the reaction medium is deemed innocuous in such use.

Examples of the preparation of the epoxide-amine reaction products and of the formation of salts therefrom, are set forth below:

EXAMPLE I

To 371 parts by weight of diacetone alcohol were added 105 parts by weight of diethanolamine and 371 parts of a diepoxide having the formula:

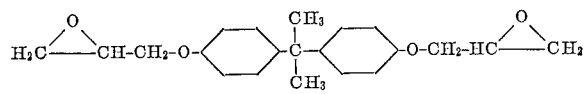

The diacetone alcohol and diepoxide were admixed and maintained at 100° C. and the diethanolamine added thereto over a period of one hour. Acetic acid was then added to the mixture until a pH of 7 was achieved. The resultant product comprised a pale yellow liquid which was stored at room temperature for a period of over one month and proved capable of dissolution in warm water after such storage. In addition, the reaction product, together with the reaction medium phase, i.e. diacetone alcohol, was employed in the preparation of an aqueous solution from which films were cast and dried upon glass plates, and which was utilized as a forming size composition for glass fibers. The cast films exhibited remarkable clarity, durability, and abrasion and moisture resistance. The glass fibers which were sized at forming with the solution of the epoxide-amine salt, possessed unusual strengths, resistance to the harmful effects of mutual abrasion, and compatibility with both epoxy and polyester impregnating resins.

EXAMPLE 2

The process of Example 1 was repeated with the substitution of 105 parts by weight of diethanolamine and 742 parts of an epoxide having the formula:

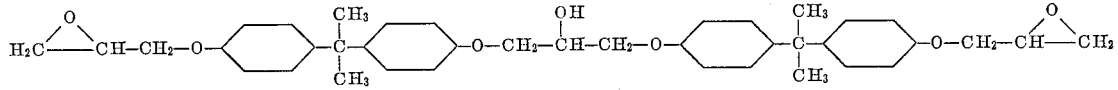

Again, the reaction product was a pale yellow liquid which was water soluble and productive of cast films of desirable properties.

EXAMPLE 3

The method of Example 1 was repeated with the substitution of 48.3 parts by weight of diethanolamine and 249 parts of an epoxide having the formula:

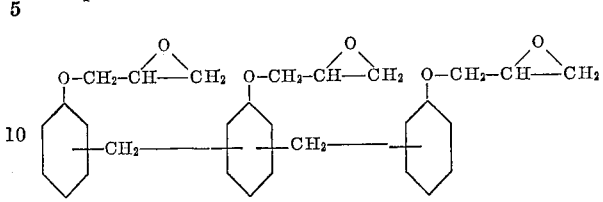

Again the resultant salt comprised a pale liquid which yielded highly satisfactory films.

EXAMPLE 4

The method of Example 1 was repeated of 68 parts by weight of ethanolamine and 217 parts of the diepoxide of Example 1. It was noted that the solubilization of the reaction product required the addition of greater quantities of acetic acid than were necessitated for the formation of the salt in Example 1, when the di-alkanol reactant was employed. Consequently, it appears that at least in some instances, an epoxide-amine compound which is more readily susceptible to solubilization, is achieved when two solubilizing aliphatic hydroxy groups are present upon the amine reactant. However, it must be noted that the reaction product was satisfactorily solubilized when only one aliphatic hydroxy group was present in the amine reactant.

EXAMPLE 5

The method of Example 1 was repeated with equimolar proportions of diethanolamine and an epoxide having the formula:

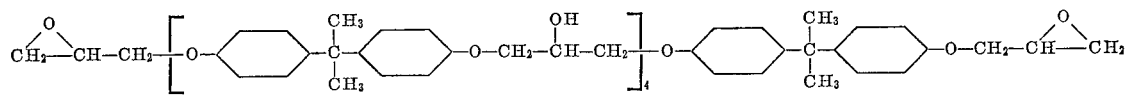

EXAMPLE 6

The method of Example 1 was repeated with 450 parts by weight of the diepoxide of Example 1, 450 parts of diacetone alcohol, and 73.5 parts by weight of an hydroxy amine, having the formula: $H_2N-C-(CH_2OH)_3$.

Since the compositions of the invention are capable of progressive cross-linking to an ultimate set and insoluble condition, they are deemed of limited "pot-life" and refrigerated storage is desirable. However, as previously noted, these compositions have been maintained at room temperature for periods in excess of a month and have retained their solubility under such conditions.

*Forming size compositions*

While the compositions of the present invention possess an obvious and general utility for conventional epoxy usages, e.g. adhesives, cast films, coatings, casting, laminating and incapsulating compositions, filament winding and pre-pregging impregnants, auto and boat repair, solders for metal bonding, stabilizers for vinyl resins, etc., and a particular and pronounced utility for those applications in which a water soluble resin is desired, their suitability as the film-forming ingredient of an aqueous forming size composition for glass fibers is especially outstanding.

This utility is unique in that the epoxide-amine compositions provide an abrasion resistant coating which exists as a continuous film and which may be safely utilized in proximity to the high temperature zone of the fiber-forming bushing. The protective qualities of the coating are enhanced not only by the abrasion resistance of the compositions, but also by means of the more continuous nature of the film which is made possible with a solution, as opposed to an aqueous emulsion, of the film-former. The safety factor results from the aqueous nature of the solution in contrast to those systems which employ volatile, anhydrous solvents. Still further, the aqueous epoxide-amine solutions may be prepared to provide a viscosity at which satisfactory quantities of the size composition are picked up by, or adhered to, the surfaces of the glass fibers, despite their rapid rate of travel. In addition, despite the short time between the application of the forming size composition and the positioning of adjacent strand segments in intimate engagement, the wound packages of the sized strands rapidly dry to a condition free from blocking whereby the strand may be readily unwound from the package.

The sized strands of the invention demonstrate an outstanding utility for the reinforcement of synthetic resins. While they are particularly suitable for the reinforcement of thermosetting resins such as epoxy resins and polyesters, they may also be employed in other thermosetting or thermoplastic matrices such as phenolic, melamine, acrylic, polyolefinic and vinyl resins.

When the sized strands are intended for applications entailing their combination with a synthetic resin, the addition of a coupling agent such as an organosilane is beneficial, and may even be of benefit in other end uses as a result of the hydrophobicity which is provided by such compounds. When the fibers or strands are intended for use with an epoxy matrix or secondary coating, an amino-silane is preferred, while unsaturated silanes such as the alkenyl silanes, e.g. vinyl, allyl, etc., or acyloxy silanes are preferred for compatibility with polyester resins. Such selections are based upon the belief that the amino groups of the amino-silanes react polymetathetically with epoxy resins while the alkenyl or carboxyl groups of the unsaturated or acyloxy silanes react or copolymerize with unsaturated carboxyl or hydroxyl groups of the polyester resins. Such organosilanes may be described as the hydrolysis products of compositions having the formula $R_nSiX_{4-n}$, wherein R is an alkenyl, amino alkyl or acyloxy group, X is a hydrolyzable group such as halogen or alkoxy, and $n$ is an integer having a value from 1–3. The actual compound utilized in the size compositions is preferably the hydrolysis product of the foregoing organosilanes in which X is converted to a hydroxy group. Representative of such compositions are the hydrolysis products of: gamma amino propyl triethoxy silane, delta N ethyl amine amino butyl triethoxy silane, vinyl trichloro silane, vinyl tris beta (methoxy ethoxy) silane, diallyl diethoxy silane, sodium vinyl siloxanolate, gamma methacryloxy propyl trimethoxy silane, and the like.

In addition, although the coated strands of the invention do not require a lubricant under conventional conditions, a small quantity of a compound such as an amine-fatty acid condensate, e.g. the condensates of tetraethylene pentamine and stearic or pelargonic acid, or an animal or vegetable oil may be incorporated for additional lubricity.

To prepare the forming size compositions of the invention, between 0.1–7% by weight, and preferably between 2–5% by weight of the amine-epoxide salt, is dissolved in water. When a coupling agent or lubricant is also added, the quantity of each should be restricted to no more than 2% by weight.

A preferred forming size composition formulation comprises an aqueous solution of 3.5% by weight of the amine-epoxide product of Example 1. When the fibers are intended for utilization in combination with an epoxy resin, 0.4% by weight of hydrolyzed gamma amino propyl triethoxy silane is preferably added. When the intended end use involves combination with a polyester resin, 0.4% by weight of hydrolyzed vinyl tris beta (methoxy ethoxy) silane is preferably added to the solution.

The size compositions of the invention may be applied by conventional contact, spray or immersion applicators such as those disclosed by U.S. 2,873,718; 2,390,370; 2,693,429; 2,846,348 or 2,732,883. When a size composition comprising a solution of 3.5% by weight of the amine-epoxide product of Example 1 and 0.4% by weight of hydrolyzed gamma amino propyl triethoxy silane is applied to glass fibers traveling at conventional forming rates by means of an apron applicator such as that disclosed by U.S. 2,873,718, the size solids present upon the dried strand comprise between 0.5–2.0% by weight of the fiber-coating composite. This quantity may be adjusted by changing the viscosity or dilution of size solution, the speed of application, the type of applicator, etc. The fibers thus sized exhibited improved abrasion resistance and strength and were readily removed from a helically wound package after the size composition had dried.

It has also been found that epoxides reacted with modifying compositions such as fatty acids and the like, for the purpose of achieving improved leveling, chemical and/or thermal properties, may also be solubilized by the inventive methods. For example, epoxides have been reacted with oleic or stearic acids, then subjected to the prescribed reaction with a monoamine, and ultimately acidified. Such compounds exhibited the same pronounced degree of water solubility which was previously described. It is believed that the modifying compound, e.g. fatty acid, reacts with a hydroxyl group derived from the splitting of an oxirane group during polymerization. In turn, the subsequently reacted amine links with an oxirane group to yield a composition of the following general type:

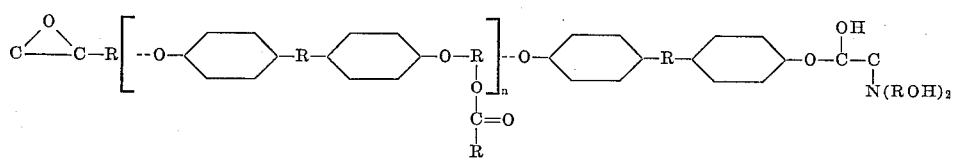

While the emphasis of the specification may appear to be directed toward forming size compositions for glass fibers, it must be noted that the invention provides essentially, novel methods for the preparation of water soluble resins particularly the epoxides, the products derived from such methods, and a variety of end uses for such products. Water soluble epoxides have long been desired in a multitude of applications such as adhesive and coating compositions generally. The desirability of such systems, i.e. aqueous solutions of such resins, is readily apparent in view of the economy and hazard reduction which are realized when water is substituted for expansive and dangerous solvents which are plagued by flammability, volatility and the like, and which in some instances act to reduce the pot life of the system. In this regard, aqueous solutions of epoxy resins must be distinguished from aqueous emulsions of such resins in that the latter yield less continuous, permeable films which are less resistant to abrasion and moisture attack, and are plagued by stability problems.

All of the above materials when solubilized in the above described manner and applied to metals, as for example carbon steel, become insoluble during drying and provide excellent corrosion resistance for the metal. Mild steel strips having a phosphate coating thereon, and of the type commonly used to test corrosion resistance, which when coated as above described can be struck from the back side with a ball peen hammer without causing the materials to spall off, and provides corrosion resistance exceeding that of conventional materials. Metal articles, as for example automobile bodies, can be immersed in large vats of aqueous solutions of the above described materials to provide corrosion resistant coatings. Referring to the formulas given above, it will be seen that the long chain molecules are substantially devoid of any groups lending water solubility thereto, excepting the terminal group which has been provided in accordance with the present invention. It will be apparent that the remaining oxirane group or groups does not lend solubility to the molecule, and that any ether linkages present are so few and so widely spaced as to have substantially no solubilizing effect on the molecule.

Inasmuch as the above materials are substantially impervious to water after having dried upon a metal or glass surface, it is apparent that the solubilizing group produced in accordance with the present invention is adjacent the coated surface, with the remainder of the molecule extending away from the surface to block off the solubilizing group once the coating has dried. A unique alignment of the molecules, therefore, is provided in which the chains extend generally perpendicularly away from the surface coated, with very little cross linking between the molecules, and this is believed to account for the high order of solubility which is achieved in the coating. Where the coating molecules have an oxirane group remaining on the end opposite to the end which has been solubilized, it is, of course, available for bonding with later applied resinous materials. This accounts for the high strengths of the laminated materials produced by impregnating glass fibers coated with the above described materials with polyesters, epoxies, or other resins. It will also be apparent that a remaining oxirane or oxirane groups on the solubilized molecule can have no effect on the solubility that is achieved, and that its presence is only required for providing the secondary characteristics which the presence of an oxirane group provides.

Epoxy materials generally have limited shelf life and, therefore, the shelf life of the long chain molecules given above can be increased by the removal of the remaining oxirane group or oxirane groups. This, of course, is most easily accomplished by reacting it with another molecule that is devoid of oxirane groups, as for example, a polyglycol, a polyester, fatty acid, alcohol, amide, polyamide, polyurethane, a vinyl chloride or polymer thereof, an acrylate, polyacrylate or copolymer thereof, an acetate, phenol formaldehyde, a phenol formaldehyde condensate, a ureaformaldehyde condensate, a melamine formaldehyde condensate, or any other material or resin having a labile hydrogen reactive with an oxirane group, as will readily be understood by those skilled in the art. It will also be apparent that the single solubilizing group above described will solubilize any of the other resins and materials given above without intervening ether groups and, therefore, any long chain polymer of a molecular weight of about 10,000 can be solubilized by the single terminal solubilizing group that has been described above at great length.

EXAMPLE 7

A coating material comprising a long chain molecule having a single solubilizing group at one end, and which is devoid of oxirane groups, is illustrated by the following formula:

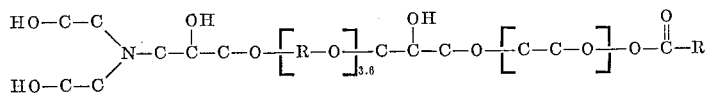

This material is prepared by dissolving approximately 1670 parts by weight of the general type of epoxide of Example 5 but having an $n$ of 3.6 with 900 parts by weight of xylene in a two liter Pyrex reactor kettle having a motor driven agitator therein, and surrounded by a Glas Col heated mantel controlled by a Variac. The vessel is suitably closed off, and is provided with a reflux condenser to prevent the escape of solvents and/or reactants. The mixture is heated to 105° C. with stirring to thoroughly dissolve the resin, and thereafter the temperature is raised to 120° C. and approximately 137 parts by weight of diethanolamine is added slowly with continuous mixing. The products are held at 120° C. for four hours to provide ample time to react all of the amine. The material produced by the above reaction was essentially that of Example 5 above and contains a preponderance of molecules having a single terminal solubilizing group at one end.

Thereafter a polyglycol, as for example a polyglycol monooleate is added and reacted with the remaining oxirane groups. Approximately 893 parts by weight of Carbowax 400 (a commercially available polyglcolmonooleate having a molecular weight of 400) is added to the reaction kettle using 5.72 parts by weight of a basic catalyst (as for example potassium hydroxide), and the mixture heated to maintain 120° C. for four hours. The resulting material has an epoxy equivalent of 3000 indicating one epoxy equivalent for 3000 grams of the material and had excellent shelf life. Samples of this material have been stored at room temperature for four months without appreciable thickening or rise in molecular weight. The material of this example can be used for any of the coating applications given above, as for example the coating on glass fibers that are to be used for reinforcing epoxy, polyester, and other resins, in pipe, rocket casings, nose cones, etc. By reacting the polyglycols for longer periods, higher numerical value of epoxy equivalent can be obtained, and this may be economically justified where even greater shelf life is necessary.

EXAMPLE 8

The method of Example 1 was repeated using two mols of diethanolamine with a diepoxide of the type given in Example 7 wherein $n$ is equal to 3.6 to provide a material having two terminal solubilizing groups per molecule as illustrated by the following formula:

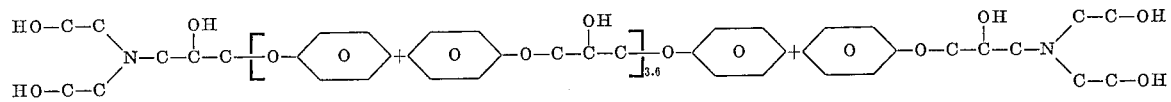

In addition, methyl cellosolve acetate was used as a solvent in place of the diacetone alcohol of Example 1 to illustrate that the reaction can be carried out in other solvents. The material produced dissolved in water more easily than did that of Example 5, above but it was not as tenacious a coating as that of Example 5, in that it spalled off of metal corrosion test strips much more easily.

EXAMPLE 9

A material having the following formula was prepared using the same method described in Example 7, but using the following materials in the parts by weight indicated:

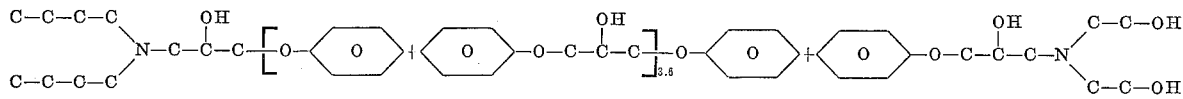

| | Parts by weight |
|---|---|
| Epoxy resin of Example 7 | 1,250 |
| Diacetone alcohol | 1,250 |
| Diethanolamine | 105 |
| Dibutylamine | 129 |

The diethanolamine and the diepoxide is reacted for two hours at 100° C. The products of this reaction is then cooled to 73° C. The dibutylamine is added and refluxed at 100° C. for two hours. The final material had an epoxy equivalent of infinity, indicating no substantial remaining oxirane groups. The percent solids was 54.19, the viscosity at 25° C. was 1570 centipoises, and it had a medium amber color. The material is as water soluble as is the materials of Examples 5 and 7 and makes an excellent coating.

EXAMPLE 10

The material having the following formula was prepared in generally the same manner as was that of Example 9 excepting that no diethanolamine was used:

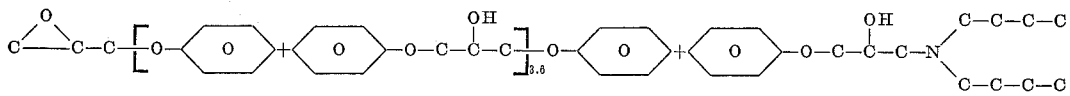

This material was not water soluble when acidified.

EXAMPLE 11

A material having the following formula was prepared using the same general procedure indicated in Example 5 above using approximately 833 parts by weight of the diepoxide of Example 7, approximately 833 parts by weight in diacetone alcohol, and approximately 42 parts by weight of butyl monoethanolamine:

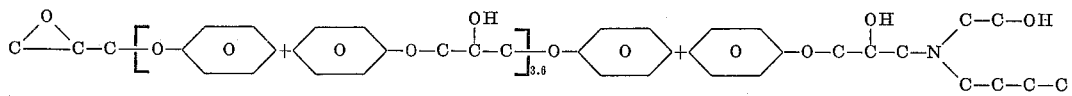

The resulting material has an epoxy equivalent of 823, has 51.33 percent solids, and a viscosity of 325 centipoises at 25° C. The resin material is clear to a light amber color, and can be solubilized in water when acidified, although it dissolves more slowly than does the material of Example 5.

EXAMPLE 12

A material having the following formula is prepared using the same general procedure given in Example 7 above using the following materials: 746 parts by weight of the diepoxide of Example 7, 330 parts by weight of xylene, 172 parts by weight of 1-octadecanol, 64 parts by weight of diethanolamine, and 3 parts by weight of potassium hydroxide:

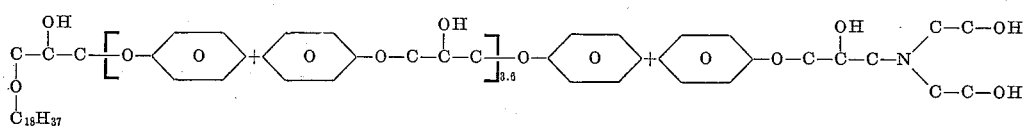

The resin is dissolved in xylene at 100° C., it is then cooled to 35° C. and the diethanolamine added. It is heated to and held at 120° C. for one hour following which a mixture of 1-octadecanol and potassium hydroxide is added and the mixture is held at 120° C. for four hours. The material when cooled has a paste like consistency with some crystal like appearance at its surface. It has an epoxy equivalent of 1893, and when acidified, it is water soluble.

EXAMPLE 13

A ureaformaldehyde resin solubilized in the manner of the present invention is made by reacting 2.5 mols of formaldehyde with one mol of urea at a pH of 4.5 to 4.6 using phthalic anhydride, formic acid, or other materials to adjust the pH. The above materials are cooked at 90° C. for approximately one and a half hours to a Gardner Hope viscosity of G and a percent solids of 55 to 60. This material is not water soluble. Thereafter water is removed by subjecting the cook to vacuum until approximately 80% solids is reached. The material is cut with approximately 25 to 30% of xylene. This material is then reacted with one mol of an epoxide having the following formula:

$$C\underset{O}{\overset{}{\diagdown\diagup}}C-C-N-C-C-OH$$
$$\phantom{CCCCCCCC}|$$
$$\phantom{CCCCCCCC}R$$

at approximately 100° C. for one hour to produce a material having the following formula:

$$R-C-\underset{|}{\overset{OH}{C}}-C-\underset{|}{\overset{R}{N}}-C-C-OH$$

The epoxide is made by reacting butyl ethanolamine with epichlorhydrin as is well known. The final product is water soluble when acidified, and is a good coating material when applied from an aqueous solution.

EXAMPLE 14

A polyester material having the following formula is prepared using the same general procedure of Example 13:

$$R-\overset{O}{\overset{\|}{C}}-O-C-\underset{|}{\overset{OH}{C}}-C-\underset{|}{\overset{R_1}{N}}-C-C-OH$$

Wherein "R" is the long chain molecule of a polyester exclusive of a carboxyl group and $R_1$ is a butyl group. The material is prepared by reacting the polyester with the epoxy of Example 13 in an organic solvent such as xylene at 100° C. for one hour or more using reflux. The resulting material when acidified is water soluble and makes a good coating material.

EXAMPLE 15

The method of Example 13 is repeated utilizing stearic acid. The resulting material is very soluble in water when acidified and is resinous in nature.

EXAMPLE 16

Any of the materials above described, or any other long chain molecule, having a single end solubilizing group above described and which when dissolved and coated on a surface, will orient on the surface with the solubilizing group adjacent the surface being coated, thus gives a desired molecular arrangement. The ionic nature of the molecule not only produces the desirable molecular arrangement on the surface but helps to produce a bond therewith.

In some instances, it may be desired to use a coupling agent between the oriented molecules and the surface being coated to further increase the bond achieved between the coating and the surface. This can be accomplished for example by using an organo-silane, as for example gamma aminopropyl triethoxy silane. One such material has been prepared by mixing the following materials: 3.7 parts by weight of the acidified product of Example 5, 0.04 part by weight of gamma aminopropyl triethoxy silane, and 96.2 parts by weight of water. When the gamma aminopropyl triethoxy silane hydrolyzes, the hydroxyl groups on the silicon atom have a strong affinity for glass and metals, and is laid down as a film adjacent the surface. The solubilizing group on the resin molecules also are oriented towards the surface, and a reaction is believed to occur between the labile hydrogen on the amine portion of the organo-silane molecules, and the OH group on the beta carbon of the solubilizing group of the resins. This material is an excellent binder coating for glass fiber mats, and is completely compatible with later applied resins, as for example polyesters, and epoxy impregnating resins.

It is apparent that the single terminal solubilizing group of the present invention can be used to solubilize any resin molecule as for example phenolformaldehyde, urea-formaldehydes, melamine formaldehydes, polyesters, polyurethanes, epoxys, polyamides, polyacrylic acid, polyacrylates, and copolymers thereof, polyvinyl chlorides, polypropylenes having reactive terminal groups, and any resin molecule having a reactive terminal group for which the terminal solubilizing group of the present invention can be substituted. These materials will produce desirable coatings having improved properties and will have secondary characteristics depending on the groups making up the bulk of the polymer chain.

Although the invention has been described in considerable detail with reference to particular resins, it is not intended to be limited thereto, since it has been amply demonstrated that the end solubilizing group will solubilize any long chain molecule to provide improved coating materials having properties which vary somewhat depending upon the other functional groups remaining on the molecules; and it is our intention to cover hereby all novel adaptations, modifications, and arrangements thereof which come within the practice of those skilled in the art, and which are covered by the appended claims.

We claim:

1. A coating material comprising an aqueous solution of a compond selected from the group consisting of an epoxide of a glycidyl ether of a polyhydric phenol and an epoxide of a glycidyl ether of a phenol-aldehyde condensate, and having a single terminal group of the formula

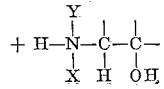

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$ OH, wherein R″ is an aliphatic hydrocarbon radical having a chain length of from 1 to 6 carbon atoms and $n$ is an integer of from 1 to 25.

2. A coating material comprising an aqueous soluble compound consisting essentially of an epoxide of a glycidyl ether of a polyhydric phenolic material, and having a terminal group on only one end of the formula

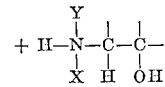

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$ OH, wherein R″ is an aliphatic hydrocarbon radical having a chain length of from 1 to 6 carbon atoms and $n$ is an integer of from 1 to 25.

3. The coating material of claim 2 wherein both X and Y are hydroxy containing radicals having a carbon to carbon chain length of less than three.

4. The coating material of claim 3 wherein said compound includes a terminal oxirane group.

5. A glass fiber coated with the residue of an aqueous solution dried in situ on the fiber and consisting essentially of an epoxide of a glycidyl ether of a polyhydric phenolic material, and having a terminal group on only one end of the formula

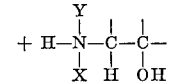

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$ OH, wherein R″ is an aliphatic hydrocarbon radical having a chain length of from 1 to 6 carbon atoms and $n$ is an integer of from 1 to 25.

6. A glass fiber coated with the residue of an aqueous solution dried in situ on the fibers and consisting essentially of a compound selected from the group consisting of an epoxide of a glycidyl ether of a polyhydric phenol and an epoxide of a glycidyl ether of a phenol-aldehyde condensate, and having a single terminal group on only one end of the formula

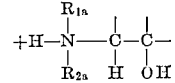

wherein R$_{1a}$ and R$_{2a}$ are hydroxy containing radicals having a carbon to carbon chain length of less than three.

7. The glass fiber of claim 6 wherein the compound includes an

wherein R″ is an aliphatic hydrocarbon radical having a chain length of from 1 to 6 carbon atoms and R‴ is the hydrocarbon radical of a fatty acid.

8. A coating material comprising an aqueous soluble compound having the following formula:

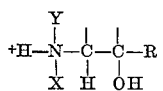

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$ OH, wherein R″ is an aliphatic hydrocarbon radical having a chain length of from 1 to 6 carbon atoms and $n$ is an integer of from 1 to 25, and R is a long chain resinous organo molecule having a molecular weight up to approximately 10,000 and devoid of the terminal group given above at its other end.

9. A coating material comprising an aqueous soluble compound having the following formula:

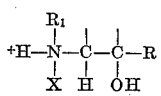

wherein R$_1$ is a hydrocarbon of from 1 to 7 carbon atoms, and X is a member of the group consisting of: (1) an aliphatic hydrocarbon having a chain length of from 1 to 7 carbon atoms and including at least one hydroxy group, (2) —OH, and (3) —(OR″)$_n$ OH, wherein R″ is an aliphatic hydrocarbon radical having a chain length of from 1 to 6 carbon atoms and $n$ is an integer of from 1 to 25, and R is a long chain resinous organo molecule having a molecular weight up to approximately 10,000 and devoid of the terminal group given above at its other end.

10. A coating material comprising an aqueous soluble compound having the following formula:

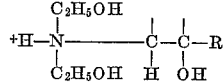

wherein R is a long chain resinous organo molecule having a molecular weight up to approximately 10,000 and devoid of the terminal group given above at its other end.

11. The coating material of claim 2 wherein epoxide groups are reacted with material having labile hydrogen which opens the oxirane ring to thereby increase shelf life of the coating material.

12. The coating material of claim 2 formed by the reaction product of diethanol amine and an epoxidized novolac having the following formula:

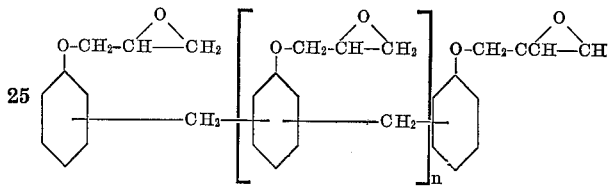

wherein $n$ is at least 1.

13. The glass fiber of claim 6 wherein the compound is the reaction product of diethanol amine and an epoxidized novolac having the following formula:

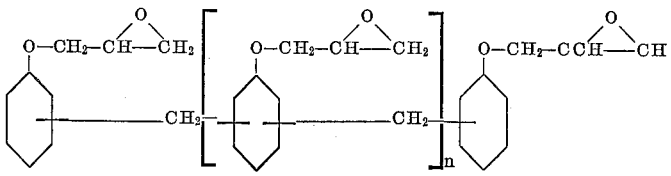

wherein $n$ is at least 1.

References Cited

UNITED STATES PATENTS

| | | | |
|---|---|---|---|
| 2,772,248 | 11/1956 | Lieberman et al. | 260—47 |
| 2,801,227 | 7/1957 | Goppel | 260—59 |
| 2,910,459 | 10/1959 | Rothrock et al. | 260—835 |
| 2,931,739 | 4/1960 | Marzocchi et al. | 117—126 |
| 3,154,460 | 10/1964 | Garner | 117—126 |

FOREIGN PATENTS

| | | |
|---|---|---|
| 229,422 | 8/1958 | Australia. |

MURRAY TILLMAN, *Primary Examiner.*

J. C. BLEUTGE, *Assistant Examiner.*